Feb. 19, 1929.
T. B. TYLER
1,702,752
VEHICLE TRANSMISSION
Filed Nov. 16, 1925    2 Sheets-Sheet 2
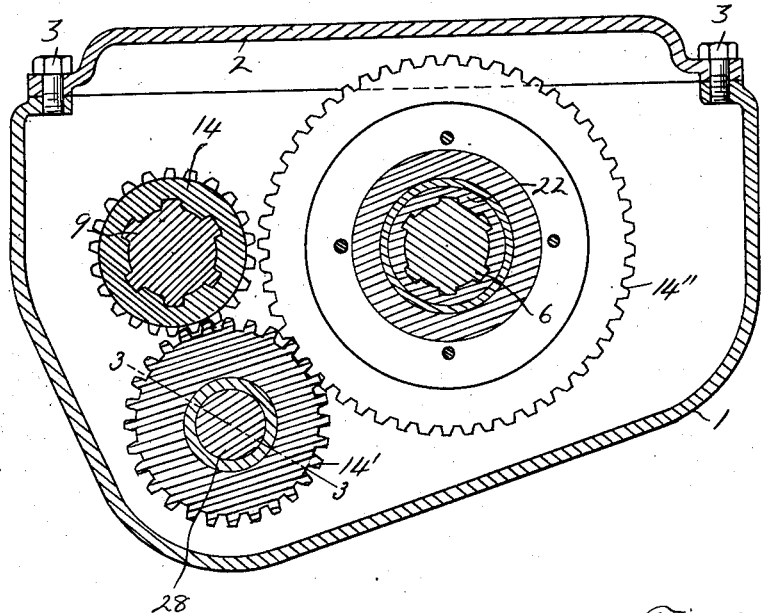
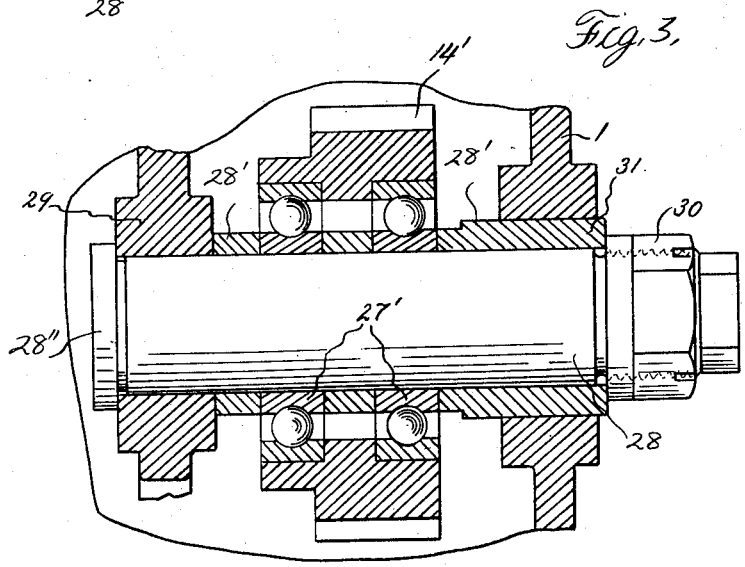
Inventor
Tracy B. Tyler
By
J. D. Murray
Attorney Patented Feb. 19, 1929.

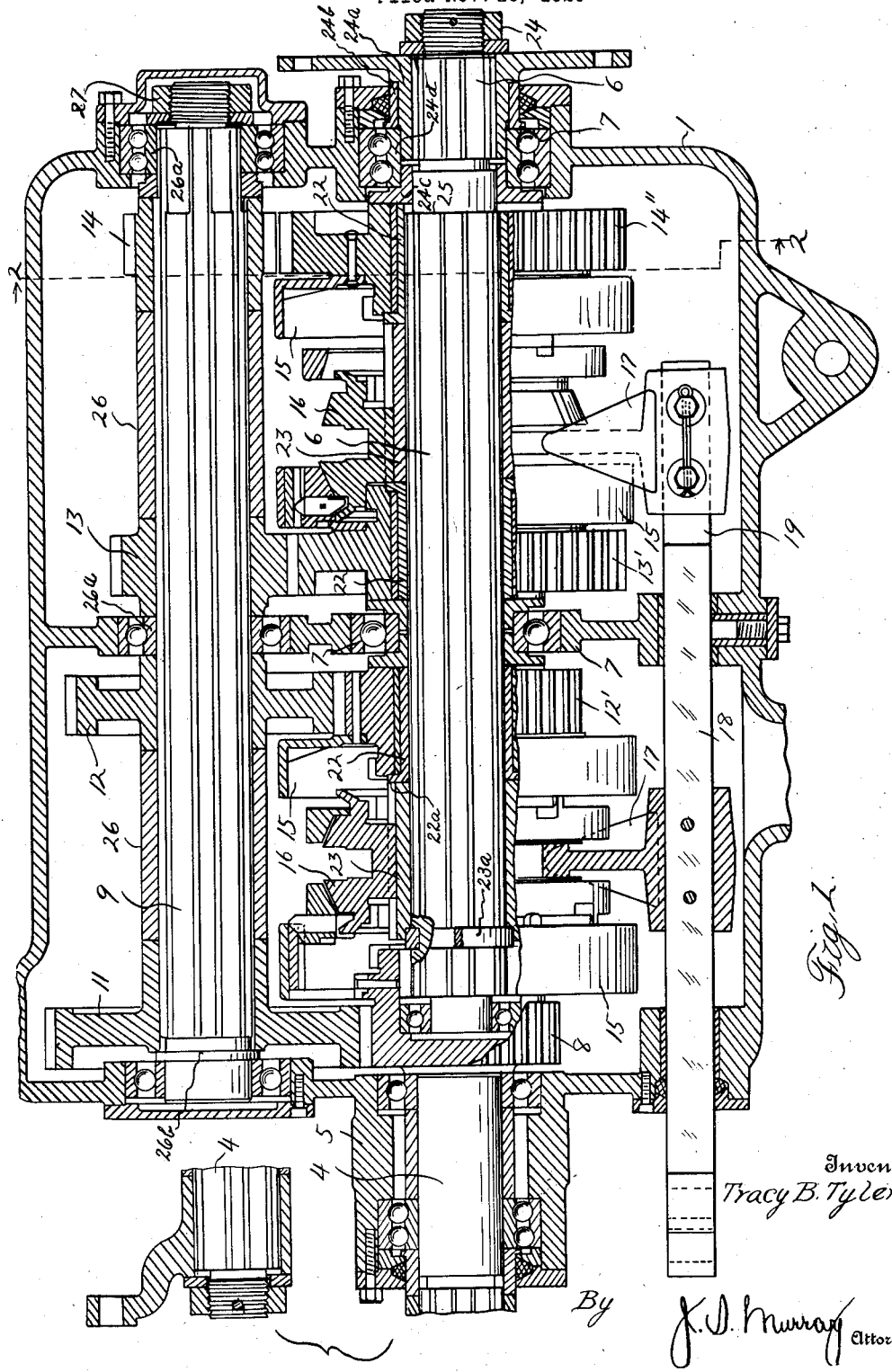

1,702,752

UNITED STATES PATENT OFFICE.

TRACY B. TYLER, OF DETROIT, MICHIGAN, ASSIGNOR TO LASSITER-BOWMAN-TYLER SYNDICATE, OF DETROIT, MICHIGAN, (RUSH E. LASSITER, THOMAS W. BOWMAN, AND WALLACE C. HALL, TRUSTEES).

VEHICLE TRANSMISSION.

Application filed November 16, 1925. Serial No. 69,281.

This invention relates to transmissions, and particularly relates to motor vehicle transmissions.

One object of the invention is to provide a transmission comprising a casing and the usual change speed gears arranged therein and to retain said gears in proper relation to each other, and to their supporting shafts without the use within the casing of cotter pins, set screws, nuts, or other fasteners which add to the work of assembly, increase the cost, and which may give rise to serious trouble in case they work loose.

Another object is to provide a transmission comprising a casing and a shaft passing through said casing and carrying transmission parts, and to maintain said parts properly positioned on said shaft by means located exteriorly of the casing.

A further object is to provide a transmission comprising a casing and transmission parts therein so mounted upon their shafts as to permit both end walls of the casing to be formed integrally with the body thereof.

These and various other objects the invention attains by the construction hereinafter described and illustrated in the accompanying drawings, wherein:

Fig. 1 is a horizontal sectional view of the improved transmission.

Fig. 2 is a cross sectional view of the transmission taken upon the line 2—2 of Fig. 1.

Fig. 3 is a fragmentary sectional view taken upon the line 3—3 of Fig. 2, and disclosing the mounting of an idler pinion through which the reverse drive may be established.

In these views the reference character 1 designates a casing which departs from ordinary practice in that its bottom and side and end walls in their entirety, are an integral unit. 2 is a detachable cover plate for said casing secured thereto by bolts 3 or other suitable fasteners.

A drive shaft 4 journaled in a bearing 5 externally integral with the casing, is alined with a shaft 6 passing through the casing and journaled in suitable bearings 7, one or more of which are directly carried by the casing while another is provided within a gear 8 fast upon the shaft 4 within the casing.

9 designates a countershaft suitably journaled in and extending through the casing and having splined thereon a gear 11 meshing with said gear 8. 12, 12′, 13 and 13′ designate pairs of transmission gears through which the shaft 6 is adapted to be driven by said countershaft in a normal direction at selective speeds, and 14, 14′, and 14″ designate a train of gears adapted to transmit a reverse drive to the shaft 6 from the countershaft. The gears upon the shaft 6 have clutch members 15 rigidly secured thereto and co-acting clutch members 16 are slidably carried by said shaft and are engaged by actuating yokes 17 fast on slide rods 18 and 19. The specific construction of the clutches 15 and 16 is not a feature of the present invention and requires no description herein.

Heretofore it has been the practice in mounting encased transmission gears upon their shafts to employ set screws, cotter pins, nuts, and other fasteners within the casing which have increased the work of assembly, and which have at times worked loose and caused considerable damage. The present invention avoids necessity for such fasteners within the casing by splining the gears 11, 12, 13 and 14 on the shaft 9 and by splining upon the shaft 6 tubular journal members 22 on which the gears 12′, 13′, and 14″ are freely rotatable. Also the sliding clutch members 16 are, in accordance with the invention, splined upon sleeves 23 which are in turn splined upon the shaft 6. Thus it is seen that while the gears 12′, 13′, and 14″ are loosely mounted with respect to the shaft 6, the sliding clutch members 16 are rotatively fast on said shaft. Thus in asembling the described construction the shaft 6 may be inserted endwise into engagement with its bearings 7 and into successive engagement with the journal members 22 and sleeves 23, said journal members and sleeves being clamped in an endwise abutting series, thus being held definitely positioned An important feature of the invention is the provision for subjecting said journal members and sleeves to such a clamping stress by an adjustable member applied to the shaft 6 exteriorly of the casing. Thus a ring 23$^a$ engaged in an annular groove of said shaft, adjacent to its inner end forms an abutment for the inner end of said series and a nut 24 upon the other end of the shaft, without the casing, transmits the clamping stress through bearing members 24$^a$, 24$^b$ and 24$^c$, and a ball race ring 24$^d$.

Each of the tubular journal members 22 has a flange 22ª at one end, holding in place the gear mounted on said member. Thus set screws, nuts and the like within the casing are avoided in positioning the gears and clutch members.

The countershaft gears 11, 12, 13, and 14 are properly spaced by sleeves 26 splined on said shaft. Said sleeves and gears together with ball race rings 26ª splined on said shaft form an endwise abutting series, and are thus held properly positioned. Said series abuts at one end against an annular flange 26ᵇ (or the like) upon the shaft 9, within the casing and a nut 27 carried by said shaft exteriorly of the casing serves to apply a clamping stress to the series.

The reversing pinion 14' is journaled upon ball race rings 27' held in proper place upon the shaft 28 by sleeves 28'. The inner end of said shaft integrally carries a flange 28" abutting against the bearing member 29 and the outer end of said shaft carries a nut 30 exteriorly of the casing which maintains an endwise clamping stress upon the sleeves 28' and ball race rings 27' exerting said stress through a bearing sleeve 31, the stress thus applied also holding the shaft from longitudinal shifting in either direction.

The mounting of all of the described parts upon their respective shafts is facilitated by the fact that said parts are readily engageable by their shafts as the latter are endwise inserted into the transmission casing, and the provision for thus assembling the parts upon their shafts make feasible the formation of the entire body of the transmission casing as a single casting, thus simplifying production of said casing and reducing its cost.

While the shaft 4 has been described as driving the shaft 6, it will be evident that this relation is reversible.

What I claim is:

1. A transmission comprising a casing, a shaft extending through said casing, spaced journal members splined upon said shaft, transmission elements journaled on said journal members, a sleeve splined upon said shaft and spacing said journal members, and means carried by said shaft exteriorly of said casing maintaining said journal members and spacer sleeve in place on said shaft.

2. A transmission comprising a casing, a shaft extending through said casing, spaced journal members splined upon said shaft, gears journaled upon said journal members, sleeves splined upon said shaft and spacing said journal members, clutch members splined upon said sleeves, coacting clutch members secured to said gears, and means carried by said shaft exteriorly of said casing maintaining said journal members and sleeves in place on said shaft.

3. A transmission comprising a casing, a shaft extending through said casing, spaced journal members fast upon said shaft to rotate therewith, transmission elements journaled on said journal members, a sleeve fixed upon said shaft to rotate therewith, and spacing said journal members, and means carried by said shaft exteriorly of said casing maintaining said journal members and spacer sleeve longitudinally positioned on said shaft.

4. A transmission comprising a casing, a shaft extending through said casing, spaced journal members fixed upon said shaft to rotate therewith, gears journaled upon said journal members, sleeves fixed upon said shaft and spacing said journal members, clutch members fixed upon said sleeves to rotate therewith, co-acting clutch members secured to said gears, and means carried by said shaft exteriorly of said casing maintaining said journal members and sleeves longitudinally positioned on said shaft.

5. A transmission comprising a casing, a splined shaft extending through said casing, spaced journal members splined upon said shaft, transmission elements journaled on said journal members, means engaging the splines of said shaft and spacing said journal members, and means carried by said shaft exteriorly of said casing maintaining said journal members and spacing means in place on said shaft.

6. A transmission comprising a casing, a shaft extending through said casing, spaced journal members splined upon said shaft, gears journaled upon said journal members, spacer members engaging the splines of said shaft between said journal members, clutch members having splined engagement with said spacer members, and co-acting clutch members upon said gears, and means carried by said shaft exteriorly of said casing maintaining said journal members and spacer members in place on said shaft.

In testimony whereof I sign this specification.

TRACY B. TYLER.